United States Patent [19]

Hull et al.

[11] Patent Number: 4,938,399
[45] Date of Patent: Jul. 3, 1990

[54] ARTICLE CARRIER

[76] Inventors: Harold L. Hull, 401 Canyon Way, Sp. 43, Sparks, Nebr. 89431; Albert B. Currey, Rte. 1, Box 185, Eucha, Okla. 74342

[21] Appl. No.: 223,903

[22] Filed: Jul. 25, 1988

[51] Int. Cl.⁵ .................................................. B60R 9/00
[52] U.S. Cl. .......................... 224/42.43; 224/42.03 A; 224/42.45 R; 280/511; 280/415.1
[58] Field of Search ................. 224/42.03 R, 43.03 A, 224/42.07, 42.08, 42.11, 42.23, 42.32, 42.41, 42.43, 42.44, 281, 42.45; 280/769, 511, 415.1, 491.2, 760

[56] References Cited

U.S. PATENT DOCUMENTS

| 3,877,622 | 4/1975 | McLain | 224/42.03 B |
|---|---|---|---|
| 4,089,554 | 5/1978 | Myers | 224/42.03 A |
| 4,202,562 | 5/1980 | Sorenson | 280/415.1 |
| 4,301,953 | 11/1981 | Abbott | 280/511 |
| 4,381,069 | 4/1983 | Kreck | 224/42.08 |
| 4,413,761 | 11/1983 | Angel | 224/42.03 R |
| 4,580,650 | 4/1986 | Matsuda | 280/769 |
| 4,596,347 | 6/1986 | Hite | 224/42.08 |
| 4,646,952 | 3/1987 | Timmers | 224/42.03 R |
| 4,671,439 | 6/1987 | Groeneweg | 224/42.03 R |
| 4,676,414 | 6/1987 | Deguevara | 224/42.03 B |
| 4,711,439 | 12/1987 | Campbell | 269/273 |
| 4,813,584 | 3/1989 | Wiley | 224/42.07 |

Primary Examiner—Henry J. Recla
Assistant Examiner—Edward C. Donovan

[57] ABSTRACT

A load carrying apparatus that attaches to the trailer hitch or receiver of a vehicle that provides a secondary hitch or receiver on the apparatus to enable the towing vehicle to carry a load on the carrying apparatus while still being able to tow a trailer or boat-trailer or the like.

3 Claims, 2 Drawing Sheets

ARTICLE CARRIER

TECHNICAL FIELD

This invention relates to a load carrying apparatus that attaches to the existing square tubular receiver for a trailer hitch of a vehicle and that provides a secondary hitch or receiver on the apparatus to enable the towing vehicle to carry a load on the carrying apparatus while still being able to attach a trailer or boat-trailer or the like, to the secondary hitch.

BACKGROUND ART

There are a number of package and article carrying devices describe in prior art, some of which use the existing square tubular receiver on the rear of a vehicle as a means to mount and secure said carrying devices, however, no one teaches a means to be able to use said devices and still be able to tow a trailer or boat-trailer or the like by providing a secondary hitch or receiver.

Exemplary of prior art carriers which are removably interconnected with the bumpers of automobiles and trucks or the like are those devices illustrated and described in U.S. Pat. No. 3,877,622 issued to McLain and U.S. Pat. No. 4,299,341 issued to Copelind et al. The Patent to Jordening, U.S. Pat. No. 4,437,549, discloses a prior art device for carrying bicycles or wheelchairs. Also, U.S. Pat. No. 4,676,414 issued to Dequevara shows a bicycle carrier which is mounted by the existing square, tubular receiver of a hitch, while U.S. Pat. No. 4,771,439 teaches a luggage carrier apparatus for a vehicle which attaches to the rear bumper.

OBJECTS AND SUMMARIES OF THE INVENTION

The present invention relates to a carrier device that overcomes the drawbacks of prior art carrier devices by providing an apparatus which is rugged yet light weight, which is highly stable and which can be easily interconnected with the existing, square receiver of a trailer hitch and which also provides a secondary hitch to which may be attached a customary second vehicle such as a trailer or boat-trailer or the like.

It is an object of the invention to provide an apparatus which is easily interconnected to an existing square tubular receiver which does not require the use of special tools.

It is a further object to provide an apparatus that allows the towing vehicle to use the load carrying apparatus in between its rear portion and the towed vehicle.

It is another purpose to use the area created by the device as a means to support varied types of containers and special brackets for mounting different objects such as bicycles, motorcycles, ski's and others to numerous to mention.

It is a further purpose to provide a storage and/or carrying space that is easily accessible and removable.

An additional purpose is to provide a storage and/or carrying space that is easily lockable.

Further objects and advantages will be apparent when considered in connection with the following specifications and drawings.

BEST MODE FOR CARRYING OUT THE INVENTION

Figure 1:
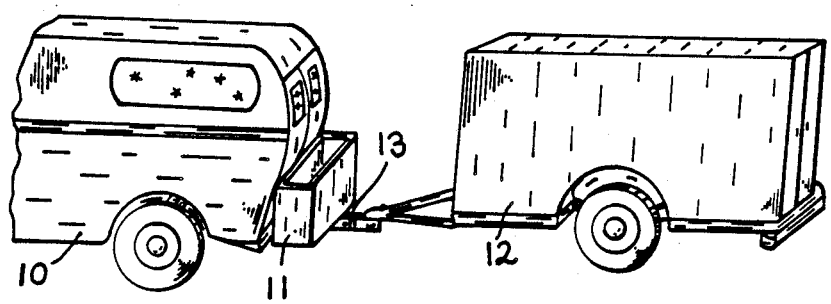
FIG. 1 is a generally schematic view of the article carrier of the present invention showing the device in position at the rear of the towing vehicle and towing a trailer.
Figure 2:
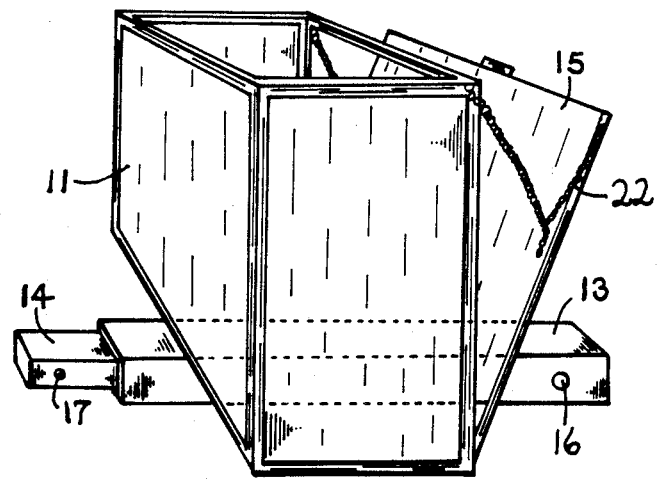
FIG. 2 is a perspective view of the preferred embodiment.
Figure 3:
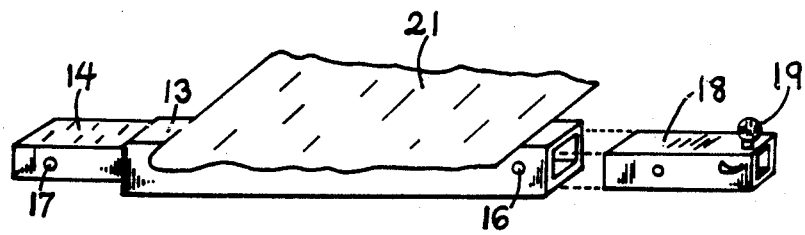
FIG. 3 is a fragmented view showing the mainframe assembly.
Figure 4:
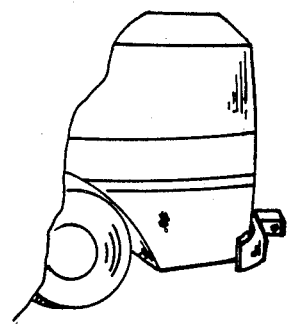
FIG. 4 is a perspective view of an existing prior art, square, tubular receiver affixed on a vehicle.
Figure 5:
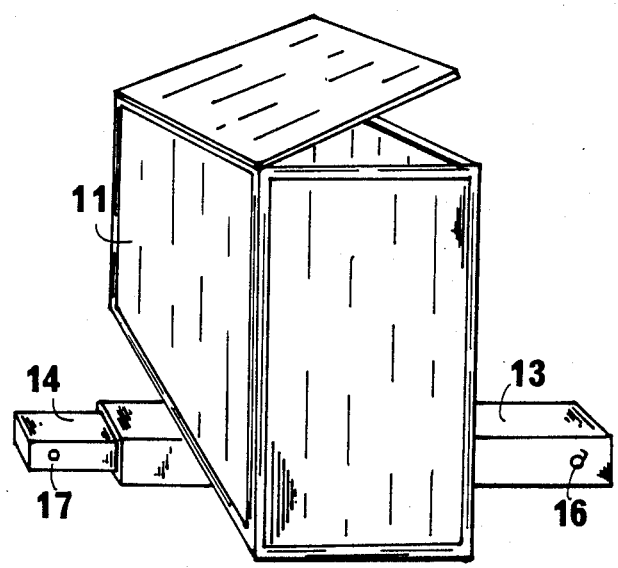
FIG. 5 is a perspective view of a second embodiment.

Referring now to the drawings, wherein like reference numerals designate identical or corresponding parts throughout the several views, FIG. 1 shows a towing vehicle 10 with a carrying box or chest 11, being mounted or welded to main support beam 13 and also pulling a trailer 12, which is attached by a conventional slider shank 18 and ball joint or hitch 19 and pinned to main support beam by a bolt (not shown) through bolt holes 16 and 20. 14 is a slider shank welded to support beam 13 and attached to the towing vehicle 10, by means of a conventional tube receptacle receiver by a bolt (not shown) through bolt hole 17. This conventional square tube receiver is ordinarily found on an automobile or other vehicle and is affixed to the vehicle by welding or bolting it to the frame of the vehicle and is normally used to receive a slider shank with a ball hitch to which a trailer may be hitched for towing. 15 is a tailgate while 22 are chains for the tailgate, while 21 is the bottom of a carrying box, chest or frame affixed or welded to main support beam 13.

Now it will be readily seen that our invention creates additional space between the towing vehicle 10, and the trailer 12, which may be used for many and varied embodiments of our invention and may be used with or without a towed vehicle.

It will also be noted that the space thus created is readily, easily and quickly available.

It will also be noted that this area can easily be locked or secured in a number of ways.

Also it is noted that the carrying device may be easily, readily and quickly removed from the vehicle for storage or moved to a more desirable place such as a campsite or the like.

It is also readily seen that this carrying apparatus may be readily removed and/or placed into position without the use of special tools.

Although the invention has been herein shown and described in what is conceived to be the most practical and preferred embodiments, it is recognized that departures may be made therefrom within the scope of the invention, which is not to be limited to the details disclosed herein but it is to be accorded the full scope of the claims so as to embrace any and all equivalent devices and apparatus.

Having described our invention, what we claim as new and desire to secure by letters patent is:

1. An article carrier adapted to be detachably connected to an existing square tubular receiver mounted to a frame of a towing vehicle, for connecting and transferring the weight of a towed vehicle, while providing an additional container means intermediate the towed and towing vehicle, the article carrier comprising:

a connection member adapted to be slidably fastened within said square tubular receiver;

a carrier member connected at its proximate end to said connection member, said carrier member consisting of a single elongate beam having an upper flat surface and being capable of supporting and transferring the weight of a towed vehicle to said connection member, the connection member then transferring the weight to a towing vehicle, said carrier member also having a container means mounted on top thereof for providing storage space;

said container means mounted to the carrier member comprising an enclosed rigid box having a bottom wall, front wall, back wall, side walls and a door, said bottom wall directly secured to said upper flat surface of said carrier member;

and a receptacle member removably attached to the distal end of said carrier member, said receptacle member having a ball hitch adapted to receive a conventional trailer hitch from a towed vehicle.

2. An article as defined by claim 1 in which said door of said container means comprises said rear wall, which has hinged means for pivotally connecting said rear wall to said bottom wall of said container means, latch means attached to said rear wall and to said sidewalls of said container means for selectively holding said rear wall in an upright and closed position, and holding means to selectively hold said rear wall at substantially a right angle to said container means when used as a tailgate.

3. An article carrier as defined by claim 1 in which said door of said container means comprises a top wall, hinge means for pivotally connecting said top wall to one of said front, back or sidewalls, latch means attached to said top wall and one or more of said front, back or sidewalls of said container for selectively holding said top wall in a closed position, and locking means for selectively locking said latch means in a position to hold said top wall in a closed position.

* * * * *